United States Patent [19]

Schulz et al.

[11] Patent Number: 4,800,315

[45] Date of Patent: Jan. 24, 1989

[54] AIR-COOLED ROTOR FOR ELECTRIC MOTOR

[75] Inventors: Manfred Schulz; Alfred Wagemann, both of Nurtingen; Gerhard Waldner, Necharhausen, all of Fed. Rep. of Germany

[73] Assignee: Metabowerke GmbH & Co., Nurtingen, Fed. Rep. of Germany

[21] Appl. No.: 97,710

[22] Filed: Sep. 17, 1987

[30] Foreign Application Priority Data

Sep. 26, 1986 [DE] Fed. Rep. of Germany ....... 3632771

[51] Int. Cl.[4] .......................... H02K 5/12; F01D 5/00
[52] U.S. Cl. ...................................... 310/261; 310/63; 310/89; 310/270
[58] Field of Search ...................... 310/58, 59, 61, 62, 310/63, 65, 166, 233, 234, 260, 261, 270, 43, 68, 89

[56] References Cited

U.S. PATENT DOCUMENTS

| | | | |
|---|---|---|---|
| 967,240 | 8/1910 | Roberts | 310/260 |
| 1,803,493 | 5/1931 | Volet | 310/270 |
| 2,381,533 | 8/1945 | Forss | 310/270 |
| 4,105,906 | 8/1978 | Ade et al. | 310/270 |
| 4,636,669 | 1/1987 | Plunkett et al. | 310/89 |

Primary Examiner—Patrick R. Salce
Assistant Examiner—D. L. Rebsch
Attorney, Agent, or Firm—Charles E. Baxley

[57] ABSTRACT

An electric motor has a ferrous core extending along, rotatable about, and centered on an axis. This core is formed with axial slots and has opposite end edges centered on the axis. A winding extends along the slots of the core and has opposite axial ends extending axially beyond the core. A fan on the core circulates air axially over the core and winding. Respective deflector cages on the winding ends each include an inner ring, an outer ring fitted over the respective end edge of the core, and a plurality of ribs extending axially and radially between the rings and projecting generally axially from the respective winding end. The ribs are spaced apart on the respective winding end such that the winding end is exposed between the ribs. Thus on rotation of the rotor, particles blown by the fan are deflected by the ribs before they engage the winding ends.

10 Claims, 2 Drawing Sheets

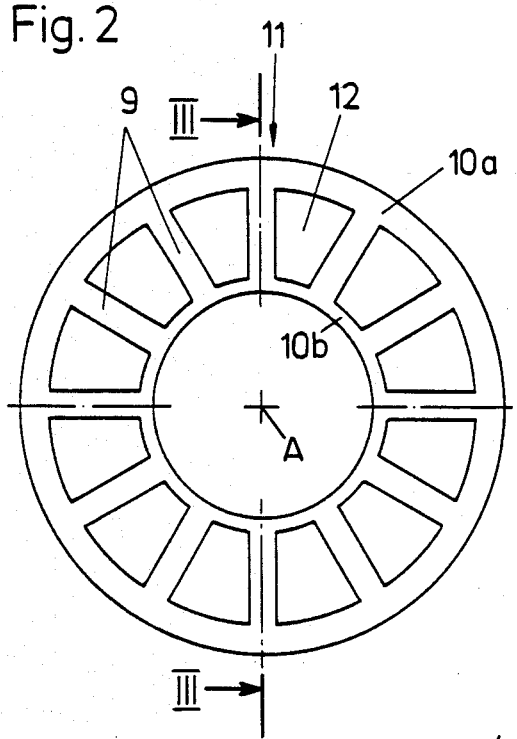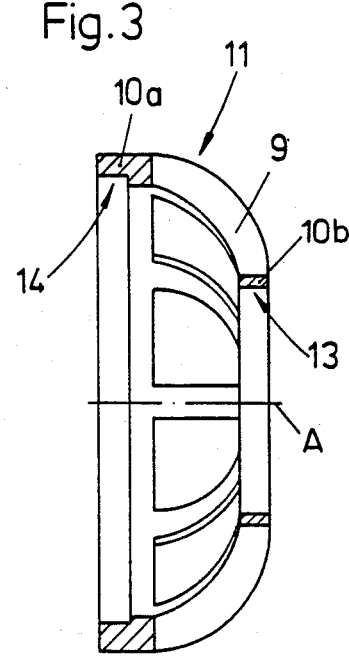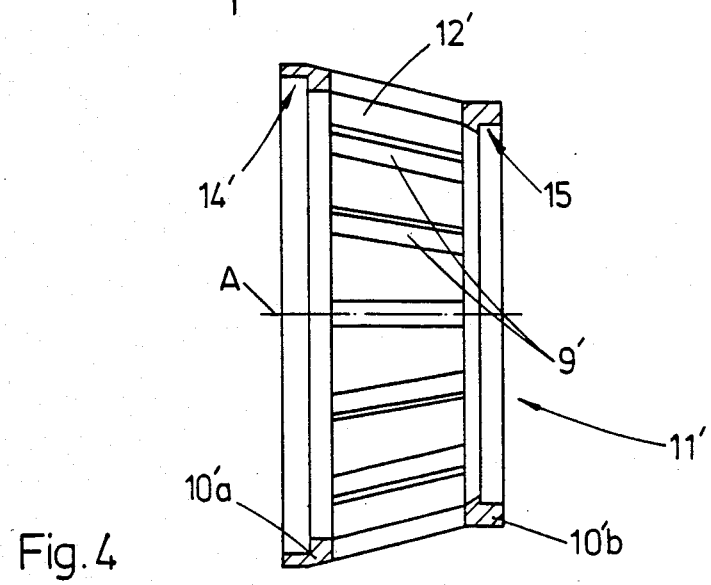

AIR-COOLED ROTOR FOR ELECTRIC MOTOR

FIELD OF THE INVENTION

The present invention relates to an armature for a high-speed air-cooled electric motor. More particularly this invention concerns a rotor for a portable tool or the like.

BACKGROUND OF THE INVENTION

The rotor of the motor of an electric drill or the like typically has a ferrous core formed of a stack of iron plates carried on a shaft and defining a cylindrical outside surface centered on the axis. This core is formed with a plurality of axially extending, radially outwardly open, and angularly equispaced slots. A winding is laid mainly into these slots but projects axially past both core ends. At one end the turns of the winding are connected to a commutator ring by means of which electricity is fed to the core and at the other ends they reverse to run back down the rotor.

When such a motor is used in a portable tool such as a drill the motor shaft carries a pinion that drives a gear train that itself drives the bit. This shaft also carries a fan that normally pulls air into the back of the motor housing to create a stream of air that passes axially through the motor over the rotor to keep it cool. The rotation rate of this type of universal motor is typically very high, above 10,000 rev/min, so that good air flow is obtained, and a very high stepdown can be used to drive the bit.

The main problem with this system is that the air drawn through the motor to cool it frequently entrains particles, those very particles freed by the tool itself. As a result of the high rotation rate not only does the air and particles entrained by the air move very fast, but the rotor itself is rotating at a very high rate so that the particles and rotor collide at very high speed. The windings that are exposed at the ends of the core are therefore struck by these particles. Unless measures are taken this will abrade the insulation off the wires of the winding and eventually lead to short circuiting of the motor.

It is therefore standard to provide a thick layer of paint over the ends of the winding, in addition to the insulating varnish that the wires are coated with anyhow. Another procedure is to pot the ends of the winding in a resin mass to protect it, or to provide a tape or string winding as protection. These methods are all reasonably effective as far as protecting the winding, but share the disadvantage that they substantially reduce the heat transfer between the rotor and the air, as the mechanical protection has a substantial insulating effect.

German patent document No. 1,797,835 describes a basket structure that closes the grooves in the rotor by means of individual groove caps. On the output side there are openings between the groove caps which merge into a completely smooth and closed end cover defining a space open only at these small openings. These openings allow the space within the cap to be complete filled with a potting compound so that the resultant assembly is thermally insulated and shares all the disadvantages of the other arrangements described above.

British Pat. No. 965,984 and French Pat. No. 1,490,764 both describe sheet metal holders for supporting the windings of the stator of an electric motor. As such, these holders have no protective effect, and furthermore they are only employed in motors which are not cooled by an axial flow of air.

OBJECTS OF THE INVENTION

It is therefore an object of the present invention to provide an improved armature for an air-cooled electric motor.

Another object is the provision of such an armature for an air-cooled electric motor which overcomes the above-given disadvantages, that is which protects the windings while ensuring good heat transfer between these windings and the stream of cooling air.

SUMMARY OF THE INVENTION

The instant invention is employed in a rotor having, as is known, a ferrous core extending along and centered on an axis and formed with axial slots, a winding extending along the slots of the core and having opposite axial ends extending axially beyond the core, and a fan for circulating air axially over the core and winding. The invention comprises a plurality of ribs fixed to the rotor and winding, each extending at least generally axially and radially over at least one of the ends of the winding so as to project generally axially from the one end. The ribs are spaced apart on the one end such that the windings are exposed between the ribs.

Thus with the system of this invention, the ribs act as a deflector that prevents particles from coming into contact with the winding. The high rotation rate of the motor causes these ribs to move so rapidly that it is impossible for a particle to get past them and actually collide with the rotor.

The ribs according to this invention are spaced from the outer surface of the winding so as to leave the entire outer surface of the winding free and in contact with the cooling air. This air stream flows axially between the ribs and over the motor, but not in a smooth laminar flow within the orbit of the ribs. Instead on the motor surface the flow is turbulent so that there is extremely good heat exchange. Thus relatively dense particles will be deflected away from the winding while the cooling air will be able to get to the winding. The high rotation rate of more than 10,000 rev/min means that it takes only a few milliseconds until each rib has moved an angular distance equal to the distance between ribs, so that the winding is effectively shielded.

According to this invention the ribs are part of a cage which has an inner ring and an outer ring, with the ribs extending between the rings. These ribs can be spaced angularly irregularly and define with the rings openings of different sizes through which the one winding end is exposed. The total area of the openings is greater than the total area of the rings and ribs for maximum heat exchange.

According to another feature of the invention at least one of the rings is formed with a centering surface centered on the axis and fitting snugly over the core. More particularly the rotor has an axial shaft carrying the core and having an outer surface centered on the axis and the inner ring is formed with an inner surface centered on the axis and snugly engaging the outer shaft surface. The core also has at the winding end an outer edge and the outer ring is formed with an inner surface centered on the axis and snugly engaging the outer edge.

The cage is made of a dielectric and is fixed to the winding by means of a varnish resin. This provides for a solid mounting while holding the cage, which is mainly symmetrical to the rotor axis, solidly in place.

DESCRIPTION OF THE DRAWING

The above and other features and advantages will become more readily apparent from the following, reference being made to the accompanying drawing in which:

FIG. 2 is an end view of one of the deflectors of the rotor of the present invention;

FIG. 3 is a section taken along line III—III of FIG. 2;

FIG. 4 is a section like FIG. 3 through the other deflector of the rotor of this invention.

SPECIFIC DESCRIPTION

Figure 1:
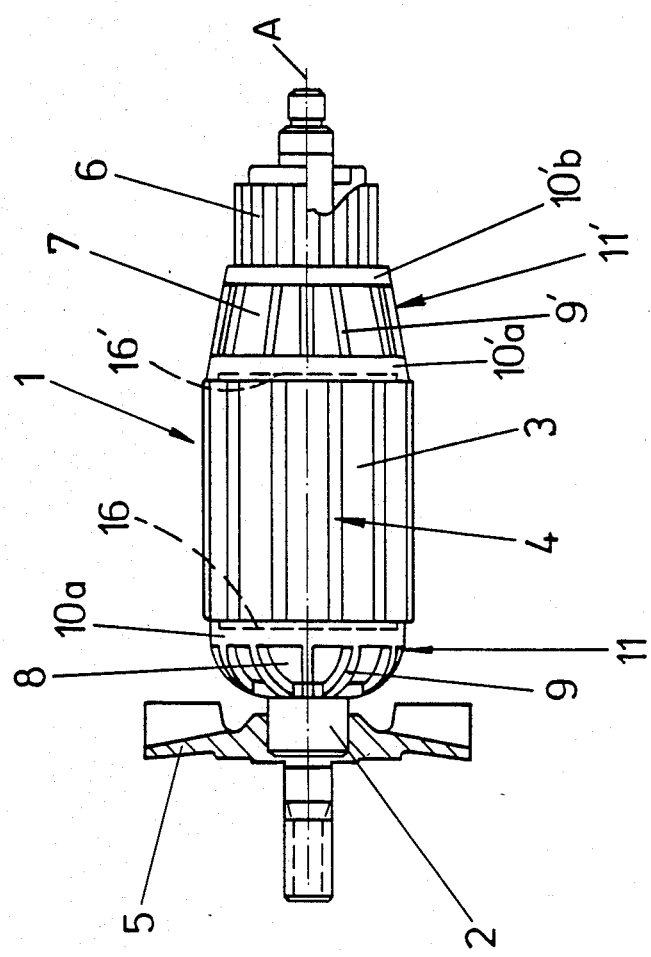
FIG. 1 is a side view of a rotor according to this invention.

As seen in FIG. 1 a rotor 1 according to this invention has a shaft 2 centered on an axis A and carrying an iron core 3 formed with a plurality of axially extending, angularly equispaced, and radially outwardly open slots 4 in which run the turns of a winding whose rear and front ends project beyond the ends 16 and 16' of the core 3 at 7 and 8, respectively. The rotor 1 is also provided on its front end with a fan 5 which, when the rotor 1 rotates at high speed about its axis A, pulls air over the rotor 1 from right to left as seen in FIG. 1. On its opposite end it has a commutator 6 that is connected to the winding end 7. This construction is standard and is typically used in a portable electrical tool such as a drill.

According to this invention and as better shown in FIGS. 2, 3, and 4, the rotor 1 is provided with a pair of deflector cages 11 and 11' on its front and rear ends 8 and 7, respectively, both cages 11 and 11' being made out of a hard but electrically substantially nonconductive material. The cage 11 as shown in FIG. 2 is formed by an outer ring 10a formed with an annular seat 14 that fits snugly over the core end 16, an inner ring 10b concentric to the ring 10a and having an inner surface 13 that fits snugly over the shaft 2, and a plurality of arcuate rectangular-section ribs 9 extending between the rings 10a and 10b. These ribs 9 extend axially forward from the outer ring 10a and curve inward to meet the ring 10b radially inward. The long dimension of the rectangular section of each rib 9 is radial of the axis A and the inner edge of each rib 9 conforms to but is spaced outward from the outer surface of the front winding end 8 with respect to the ribs 9, it is important that there is a space between adjacent ribs. Moreover, the ribs project from the outer surface of the winding heads 7,8 in order to deflect particles in the air stream which come in contact with the winding head.

Similarly the rear end 7 of the winding 7 is provided with a cage deflector 11' formed by an outer ring 10a' formed with an annular seat 14' that fits snugly over the core end 16', an inner ring 10b' concentric to the ring 10a' and having an inner surface 15 that fits snugly over the commutator ring 6, and a plurality of straight ribs 9' that extend along a frustocone from the outer ring 10a' to the inner ring 10b'. The rear coil end 7 has a frustocoincal outer surface whose shape is followed by the ribs 9, which are, like the ribs 9, spaced outward from this end 7.

The ribs 9 are angularly equispaced and lie in respective planes including the axis A so as to define identical openings 12. The ribs 9' are similarly oriented and define openings 12'. The combined area of the openings 12 and 12' is much greater than the combined area of the rings and ribs of the respective cages 11 and 11', so that this structure does not shield a major portion of the respective winding ends 8 and 7. In addition the snug fits of the inner and outer rings on the solid structure of the core 1 ensures that they will not move, and according to this invention a resin varnish is employed to fix the cages 11 and 11' on the core 3.

Figure 5:
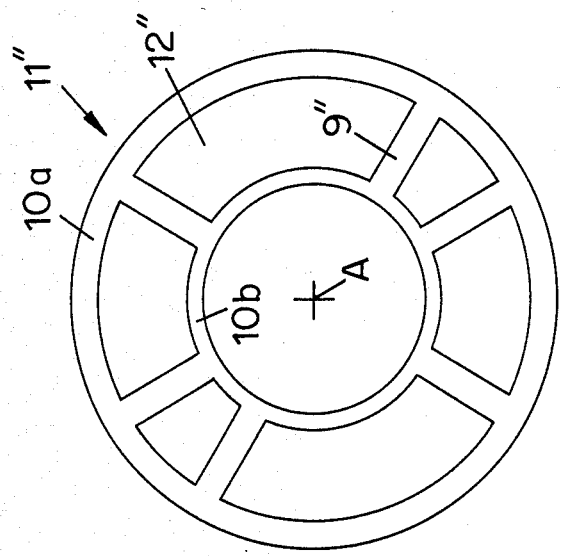
FIG. 5 is a view like FIG. 2 of yet another deflector according to the present invention.

It is also possible as shown in FIG. 5 to use a deflector 11" identical to that of FIGS. 2 and 3, but having ribs 9'" defining spaces 12" of different sizes. This effect is achieved by varying the angular spacing between the ribs 9'" while of course maintaining the center of mass on the axis A to prevent throw when the deflector 11" is rotated at high speed. This irregularity maintains turbulent flow at the surface of the coil ends 7 and 8.

In use, any particles entrained axially from right to left as seen in FIG. 1 by rotation of the fan at high speed, will be intercepted and flung radially outward by the ribs 9 and 9' before they can possibly come into contact with coil ends 7 and 8. The angular velocity of these ribs is such, relative to their size and spacing and to the speed of the incoming air stream, that it is impossible for a dense particle to move through an opening without being impacted and thrown radially outward by one of the ribs 9 and 9'. At the same time the turbulent flow at the surface will afford excellent cooling action.

We claim:

1. In combination with a rotor having:
    a ferrous core extending along and centered on an axis and formed with axial slots;
    a winding extending along the slots of the core and having opposite axial ends extending axially beyond the core; and
    means for circulating air axially over the core and winding; the improvement comprising:
    a plurality of ribs fixed to the rotor and winding and each extending at least generally axially and radially over at least one of the ends of the winding so as to project generally axially from the one end, the ribs being spaced apart on the one end such that the winding is exposed between the ribs.

2. The improved rotor defined in claim 1 wherein the ribs are part of a cage.

3. The improved rotor defined in claim 2 wherein the cage has an inner ring and an outer ring and the ribs extend between the rings.

4. In combination with a rotor having:
    a ferrous core extending along and centered on an axis and formed with axial slots;
    a winding extending along the slots of the core and having opposite axial ends extending axially beyond the core; and
    means for circulating air axially over the core and winding;
    the improvement comprising:
    a plurality of ribs fixed to the rotor and winding and each extending at least generally axially and radially over at least one of the ends of the winding so as to project generally axially from the one end, the ribs being spaced apart on the one end such that the winding is exposed between the ribs, wherein the ribs are part of a cage having an inner ring and an outer ring and the ribs extend between the rings and wherein the ribs are spaced angularly irregularly and define with the rings openings of different sizes through which the one winding ends is exposed.

5. The improved rotor defined in claim 4 wherein the rings and ribs define openings through which the one winding end is exposed, the total area of the openings being greater than the total area of the rings and ribs.

6. The improved rotor defined in claim 4 wherein at least one of the rings is formed with a centering surface centered on the axis and fitting snugly over the core.

7. The improved rotor defined in claim 4 with an axial shaft carrying the core and having an outer surface centered on the axis, the inner ring being formed with an inner surface centered on the axis and snugly engaging the outer shaft surface.

8. The improved rotor defined in claim 4 wherein the core has at the one winding end an outer edge and the outer ring is formed with an inner surface centered on the axis and snugly engaging the outer edge.

9. The improved rotor defined in claim 4, further comprising a varnish resin adhesive fixing the cage to the one end.

10. In an electric motor comprising:

a ferrous core extending along, rotatable about, and centered on an axis, the core being formed with axial slots and having opposite end edges centered on the axis;

a winding extending along the slots of the core and having opposite axial ends extending axially beyond the core;

fan means for circulating air axially over the core and winding;

respective cages on the winding ends and each including an inner ring, an outer ring fitted over the respective end edge of the core, and a plurality of ribs extending axially and radially between the rings and projecting generally axially from the respective winding end, the ribs being spaced apart on the respective winding end such that the winding is exposed between the ribs, whereby on rotation of the rotor particles blown by the fan means are deflected by the ribs before they engage the winding ends.

* * * * *